United States Patent Office 3,579,475
Patented May 18, 1971

3,579,475
CROSS-LINKED POLY(ARYLSULPHONE ETHERS)
Michael Edward Benet Jones, 45 Richmond Crescent, Vicars Cross, Chester, England, and Brian Edmund Jennings, Cherry Acre, 40 Harmer Green Lane, Digswell, Welwyn, Hertfordshire, England
No Drawing. Continuation of application Ser. No. 755,492, Aug. 7, 1968. This application Feb. 17, 1970, Ser. No. 12,141
Int. Cl. C08g 25/00
U.S. Cl. 260—37
9 Claims

ABSTRACT OF THE DISCLOSURE

A thermoplastic polymer containing aromatic residues in the polymer chain is cross-linked by heating with an aromatic compound containing at least two sulphonyl chloride, bromide, hydrazide or ester groups. The thermoplastic polymer may itself contain at least two of these reactive sulphonyl groups per chain and can be cross-linked on heating alone.

---

This is a continuation of our application Ser. No. 755,492 filed Aug. 7, 1968, and now abandoned.

The present invention relates to the production of cross-linked resins, particularly in shaped form.

According to the present invention, a process for producing a cross-linked resin comprises heating a mixture of (i) a thermoplastic polymer containing aromatic residues in the polymer chain and (ii) an aromatic compound containing at least two groups of the formula —$SO_2X$ each attached directly to an aromatic carbon atom, where X is an monovalent atom or group which promotes the thermal scission of an —$SO_2X$ group from an aromatic carbon atom at a temperature of at least 150° C. Mixtures of such polymers and mixtures of the aromatic compounds may be used if desired. The mixture of (i) and (ii) may be intramolecular in the sense that the thermoplastic polymer may itself contain at least two groups of the formula —$SO_2X$ per chain, and such a cross-linkable prepolymer can be used as a cross-linkable mixture of (i) and (ii) according to the invention.

All thermoplastic polymers having one or more replaceable aromatically-bound hydrogen atoms in the polymer chain may be used in the process of the invention. The cross-linking reaction is effected by the insertion of bridging units between the aromatic residues of adjacent chains and therefore where it is desirable to obtain a highly cross-linked product it is preferred to use polymers having a large number of aromatic residues containing replaceable hydrogen atoms. Examples are polymers containing phenylene or other divalent aromatic residues directly bound to each other or linked by oxygen or sulphur atoms or sulphoxide, sulphone, ketone, carboxylate, carbonate, amido, alkylene or acetal or ketal groups. Examples are polyphenyls, polybenzyls, polyphenylethers, polyphenylsulphides, polyketones (for example those described in U.S. application Ser. No. 426,399 filed Jan. 18, 1965, and now abandoned), polysulphones (for example those described in U.S. application Ser. No. 320,508, filed Oct. 31, 1963), polybenzimidazoles, polypyromellitimes and poly(xylylene glycol formals). Copolymers such as polysulphone-ketones may also be used, as may materials in which both the nonaromatic and aromatic links in the polymer chain vary from unit to unit in the chain. The aromatic residues may carry substituents if desired but at least some of them in each chain must contain unsubstituted points for cross-linking.

Because of the ease with which they are cross-linked and the attractive physical properties of the cross-linked products, the polyarylsulphones described in the abovementioned Ser. No. 320,508 are preferred. These polymers may be formed from at least one compound containing a sulphonyl halide group and a hydrogen atom each bound to an aromatic ring or from a mixture comprising at least one compound containing at least two aromatically bound sulphonyl halide groups and at least one compound containing at least two aromatically bound hydrogen atoms or from a mixture of all three types of compound, in each case in the presence of a suitable catalyst and in the liquid phase (i.e. by melting or heating in a suitable solvent, e.g. nitrobenzene). The reaction mixture may also contain at least one compound containing two aromatically bound carbonyl halide groups or at least one compound containing a carbonyl halide group and a hydrogen atom each bound to an aromatic ring or a mixture of such compounds.

Preferred polysulphones have excellent thermal stability at the temperatures normally used in the process of the invention, are inert to a wide variety of chemicals even at elevated temperatures of the order of 100° C, or even higher and are substantially insensitive to sulphur dioxide or other gases such as hydrogen chloride that may be evolved during the cross-linking reaction, and are formed of from 100 to 70 mole percent of repeating units having the structure —Ar—$SO_2$— and from 0 to 30 mole percent of repeating units having the structure —Ar—CO— where Ar is a divalent aromatic residue derived from benzene, a condensed polynuclear hydrocarbon, diphenyl or a compound of the formula

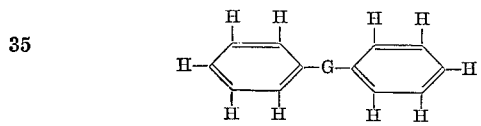

wherein G is oxygen, sulphur, sulphoxide, a divalent hydrocarbon radical, a substituted divalent hydrocarbon radical, a residue of a diol containing only carbon atoms or ether or thioether groups in the chain between the hydroxyl groups, and wherein one or more (but not all) of the hydrogen atoms bound to the aromatic rings may be substituted by other monovalent atoms or groups, and Ar may vary from unit to unit in the polymer chain. Those polymers containing in the polymer chains only benzene rings and sulphone groups and one or more of oxygen atoms, sulphur atoms and ketone groups are particularly useful because of their chemical inertness. It is preferred that not more than four-fifths of the benzene rings in the polymer chain are linked directly together in pairs since polyaryls tend to be infusible, insoluble and difficult to handle.

While it is not unlikely that part of the cross-linking occurs by a Friedel-Crafts reaction, the principal cross-linking reaction is thought to occur by the generation of free radicals from the aromatic cross-linking agents by loss of the two —$SO_2X$ groups which themselves decompose to yield sulphur dioxide and HX, the hydrogen coming from the aromatic residue on the polymer chain which is attacked by the free radical. This is indicated by the observation that sulphur dioxide and hydrogen chloride gas are evolved when the agent is a disulphonyl chloride. Thus, the cross-linking agents of the invention are those containing the aromatically bound radical —$SO_2X$ where X is an atom or group that promotes the generation of free radicals by thermal scission of the —$SO_2X$ group from the aromatic carbon atom. Examples of such agents are those in which X is a halogen atom (e.g. chlorine or bromine), a hydrazide group, or a group of the formula —OR where R is alkyl, cycloalkyl or aralkyl, preferably containing not more than 8 carbon atoms. The sulphonyl (—SO$_2$X) groups may be attached to the same aromatic nucleus or to different aromatic nuclei which are linked together directly or by any suitable divalent atom or group. Linking groups which may be thermally unstable at the temperature of the reaction, or sensitive to the by-products of the reaction (for instance sulphur dioxide, hydrogen chloride or possibly chlorine), are generally unsuitable. For this reason cross-linking agents having a single aromatic nucleus, or having two or three aromatic nuclei linked by —O—, —S—, —SO$_2$—, —CO— and/or another aromatic nucelus are preferred. The most suitable aromatic nucleus is benzene because of the ready availability of its sulphonyl derivatives, but others include, for example, naphthalene, indene, anthracene, phenanthrene and suitable heterocyclic nuclei such as dibenzofuran. The aromatic nuclei may also contain unreactive substituents if desired, e.g. alkyl, cycloalkyl, ether and thioether radicals, preferably those containing not more than four carbon atoms, and their halogenated derivatives.

Examples of cross-linking agents according to the invention are the disulphonyl chlorides, bromides and hydrazides, and the alkyl, cycloalkyl and aralkyl (e.g. methyl, ethyl, isopropyl, butyl, cyclohexyl and benzyl) esters of the disulphonic acids derived from benzene, naphthalene, anthracene, diphenyl, diphenylether, diphenylsulphide, diphenylsulphone, benzophenone, polyphenylalkanes, 1,4-diphenoxybenzene, and dibenzofuran.

The presence of even trace amounts of cross-linking agent will cause some cross-linking, and an increase in the amount of cross-linking agent present in the reaction mixture will increase the amount of cross-linking in the product. For most applications from 1 to 10% by weight of cross-linking agent, based on the weight of thermoplastic polymer, has been found to produce satisfactory cross-linked products.

The polymer and cross-linking agent may be heated alone or, if desired, in the presence of a suitable catalyst, for example ferric chloride or a cuprous compound, particularly cuprous chloride. The process is effected at a temperature of at least 150° C. because the reaction is generally undesirably slow at lower temperatures and may not occur at all. The rate of the reaction at a particular temperature depends on the chemical nature of the cross-linking agent used and possibly also on the chemical nature of the polymer. Some substituents lead to reactivity at lower temperatures. For example, diphenyl ether 4,4'-disulphonyl chloride requires a temperature of at least 220° C., while the reaction of anisole 2,4-disulphonyl chloride can be detected at 120° C. although 150° C. represents a lower limit to the useful range of temperature. Suitable temperatures for most combinations of polymer and cross-linking agent are in the range 280 to 360° C. At higher temperatures, decomposition of the polymer may occur.

If it is desired, for example, to obtain the product in the form of a film or other simple shape, the polymer (or cross-linkable prepolymer) may be dissolved in a suitable solvent, and (if required) a cross-linking agent is added. The shape may then be cast from the solution, the solvent removed by any suitable method (such as the application of heat or vacuum or both), and the shape then heated to effect cross-linking. Alternatively, where the polymer is not itself a cross-linkable prepolymer, it may be heated until it is molten, the cross-linking agent added to the melt, and the mixture then heated further if necessary to cause cross-linking. In this case, it is preferred to use a polymer which is molten below the temperature at which cross-linking would occur at a noticeable rate. For most purposes, this generally means a temperature below 220° C.

The process of the invention is particularly suitable for the manufacture of reinforced plastics. Suitable fillers for reinforcement include fibrous materials such as asbestos or fibrous glass (to improve the flexural strength of the product), granular materials such as powdered metal or metal oxide (to improve its hardness), and flake materials such as mica or graphite. For example, a shaped article of fibrous asbestos or fibrous glass impregnated with the cross-linked resin may be formed by holding or supporting the fibrous material (e.g. as a mat or scrim) in the desired shape, conveniently against a moulding surface which has preferably been coated with a release agent, and then impregnating the material with a liquid mixture containing the polymer and cross-linking agent and heating the impregnated structure to effect cross-linking of the polymer. If the liquid is a solution, the solvent should be removed before or during the cross-linking step. Thick-walled bodies may be obtained (for example) by laying up sheets of the fibrous material in the desired shape, impregnating the laminate and curing the result. In an alternative method, a mould may be coated with a release agent and then sprayed simultaneously with finely chopped glass fibre or asbestos fibre and a solution containing the polymer and cross-linking agent. This may be done conveniently using a spray gun with two nozzles, one supplied with the fibrous material and the other with the liquid mixture. The solvent is removed and the impregnated fibre coating is then heated to effect cross-linking of the polymer and further coatings applied and cured if desired.

The walls of shaped articles may be reinforced by applying to them the liquid mixture containing the polymer and cross-linking agent and then laying on the fibrous reinforcement, or alternatively by spraying them with chopped fibre and a solution of cross-linkable mixture as described above and thereafter heating the mixture to effect cross-linking. It may be desirable initially to apply an adhesive coating to the wall as a primer.

As the cross-linking reaction is accomplished by the evolution of gaseous sulphur dioxide and possible other gaseous products, it is generally desirable to effect the reaction under conditions which avoid foaming the resin. This is generally attained by applying pressure during the cross-linking reaction. These conditions will depend upon the shape and size of the article to be formed, the temperature of the reaction and the nature of the cross-linking agent and may be established by simple experiment. In the manufacture of simple shapes formed from fibrous compositions impregnated with the resin, the final heating step is conveniently effected with the impregnated composition placed in a press.

Many of the polysulphones described above are formed from starting materials which may include disulphonyl halides also used as cross-linking agents in the present reaction and in such cases the cross-linked resin may be formed simply by using the disulphonyl halide in excess of that required in the polymerisation reaction and then subjecting the product to a temperature of at least 150° C. by the process of the present invention to effect cross-linking. Conveniently, where the polymerisation is effected in a solvent for the polymer, the solution obtained from the polymerisation may be used to impregnate fibrous compositions such as fibrous glass or fibrous asbestos before removing the solvent and cross-linking the polymer. In many cases, however, it is desirable first to remove the traces of catalyst used in the polymerisation reaction.

The products of the process of the invention are useful as structural materials, particularly when they contain fillers and especially fibrous fillers such as glass and asbestos. Particular products may be used, for example, for the manufacture of housings for electrical motors and gear boxes, for the manufacture of parts of vehicle bodies or boat hulls, or in the manufacture of shields for apparatus exposed to nuclear radiation.

This invention is illustrated by the following examples in which all parts are expressed as parts by weight except where otherwise indicated.

EXAMPLE 1

1 part of poly(diphenylether sulphone) having a reduced viscosity (measured on a solution of 1 g. in 100 cm.³ of dimethylformamide at 25° C.) of 0.21 was mixed thoroughly with 0.12 part of diphenylether - 4,4'-disulphonyl chloride and the mixture was heated for three minutes at 340° C. The melt foamed with evolution of hydrogen chloride and sulphur dioxide and on cooling the foamed product was found to be insoluble. A sample of the polymer to which no disulphonyl chloride had been added was still soluble in dimethylformamide after the same heat treatment.

EXAMPLE 2

Two solutions were made up both containing 2.2 parts of poly(diphenylether sulphone) having a reduced viscosity of 0.42 in 24 parts of nitrobenzene. To one of the solutions was added 0.101 part of diphenylether-4,4'-disulphonyl chloride and to the other was added 0.044 part of the same compound. In each case, after thorough mixing, the solvent was evaporated under nitrogen at 130° C. for 24 hours to yield a film which was heated for a further two hours at 200° C. Each film was then heated at 300° C. for four hours to yield a black insoluble product.

EXAMPLE 3

7.302 parts of diphenylether-4,4'-disulphonyl chloride, 3.449 parts of diphenylether and 0.142 part of 4,4' - diphenoxybenzene were dissolved in 60 parts of nitrobenzene and heated to 100° C., when a solution of 0.08 part of ferric chloride in 12 parts of nitrobenzene was added. When 86% of the theoretical total amount of hydrogen chloride had been evolved, the mixture was cooled and divided into twelve parts of equal volume. 0.06 part of diphenylether-4,4'-disulphonyl chloride was added to each of six of the samples and 0.202 part of the same compound added to the remaining six samples. Each resulting solution was then stirred and used to impregnate a disc of asbestos paper 8.9 cm. in diameter. The impregnated discs were dried at 120° C. for 8 hours and then at 150° C. for 24 hours, and were then pressed for 20 minutes at 320° C. under a pressure of 31.5 kg./mm.² to yield hard, rigid products from which the resin could not be removed by solvation.

EXAMPLE 4

Diphenylether (8.51 g.; 0.05 mole) and diphenylether 4,4'-disulphonyl chloride (22.03 g.; 0.06 mole) in nitrobenzene (25 ml.) were brought to 120° C. and ferric chloride (0.806 g.) in nitrobenzene (3.5 ml.) was added. The reaction mixture was kept at 120° C. until 0.04 mole of hydrogen chloride had been evolved. The reaction mixture was then cooled and poured into a large excess of methanol with vigorous stirring to precipitate the polymer. The precipitate was freed from nitrobenzene by further maceration in methanol, and was then dried in the form of a fine powder at 50° C. at 10 mm. mercury for 12 hours. The cross-linkage polymers thus produced had a reduced viscosity (measured as described in Example 1) of 0.1.

The polymer was dissolved in chloroform at 50% w./v. and this solution was used to impregnate asbestos paper so that the impregnated material had 35% by weight of polymer after removal of the solvent. The impregnated mats were placed together in layers and cured by heating at 300° C. for 30 minutes in a press under a pressure of 0.79 kg./mm.² to produce a black tough laminate. Pieces of asbestos cloth and glass cloth were treated similarly.

We claim:
1. A cross-linkable composition which comprises (1) a thermoplastic polymer containing only benzene rings, sulphone groups and oxygen atoms as represented by the repeating unit —Ar—SO₂— wherein Ar is

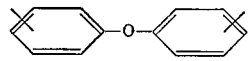

mixed with (2) an aromatic compound selected from the group consisting of the disulphonyl chlorides, bromides, hydrazides and the alkyl, cycloalkyl and aralkyl esters of the disulphonic acids derived from benzene, naphthalene, anthracene, diphenyl, diphenylether, diphenylsulphide, diphenylsulphone, benzophenone, polyphenylalkanes 1,4-diphenoxybenzene, and dibenzofuran.

2. A composition according to claim 1 wherein said polymer is poly(diphenylether sulphone) and said aromatic compound is dephenylether-4,4'-disulphonyl choride.

3. A reinforcing filler composition comprising a reinforcing filler which has been impregnated with a cross-linkable composition in liquid forms, as claimed in claim 1, and then heated to cross-link the polymer.

4. A reinforcing filler composition according to claim 3 in which the reinforcing filler is asbestos.

5. A reinforcing filler composition according to claim 3 in which the reinforcing filler is glass.

6. A cross-linkage composition which comprises (1) a thermoplastic polymer containing only benzene rings, sulphone groups and oxygen atoms as represented by the repeating unit —Ar—SO₂— wherein Ar is

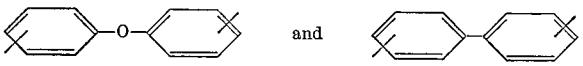

and not more than four-fifths of the benzene rings in the polymer chains are linked directly together in pairs, mixed with (2) an aromatic compound selected from the group consisting of the disulphonyl chlorides, bromides, hydrazides and the alkyl, cycloalkyl and aralkyl esters of the disulphonic acids derived from benzene, naphthalene, anthracene, diphenyl, diphenylether, diphenylsulphide, diphenylsulphone, benzophenone, polyphenylalkanes 1,4-diphenoxybenzene, and dibenzofuran.

7. A reinforcing filler composition comprising a reinforcing filler whih has been impregnated with a cross-linkable composition in liquid form, as claimed in claim 7, and then heated to cross-link the polymer.

8. A reinforcing filler composition according to claim 6 in which the reinforcing filler is asbestos.

9. A reinforcing filler composition according to claim 6 in which the reinforcing filler is glass.

References Cited

Bain et al. Proc. Chem. Soc., 1962, 186–87.

WILLIAM H. SHORT, Primary Examiner

M. GOLDSTEIN, Assistant Examiner

U.S. Cl. X.R.

117—124, 126; 161—192, 205; 260—32.4, 33.8, 49, 79.3